July 30, 1957 W. E. MORRIS ET AL 2,801,198
DECORATIVE CORE STOCK LAMINATING VARNISHES AND
PHENOLIC RESIN CORE AND DECORATIVE LAMINATES
PRODUCED THEREFROM
Filed June 13, 1955

INVENTORS
WILLIAM E. MORRIS
JOHN M. VERDI
BY
ATTORNEY

2,801,198

DECORATIVE CORE STOCK LAMINATING VARNISHES AND PHENOLIC RESIN CORE AND DECORATIVE LAMINATES PRODUCED THEREFROM

William E. Morris, Clifton, and John M. Verdi, Paramus, N. J., assignors to Allied Chemical & Dye Corporation, New York, N. Y., a corporation of New York Application June 13, 1955, Serial No. 515,218

10 Claims. (Cl. 154—43)

This invention relates to phenol-formaldehyde resins and more particularly refers to core stock varnishes for use in decorative laminates and decorative laminates produced therefrom.

Decorative laminates consist essentially of three elements:

(1) Several sheets of kraft paper impregnated with phenolic resin (about 25–35%), commonly known as the "core."

(2) A print sheet such as alpha cellulose impregnated with melamine resin.

(3) A translucent overlay sheet (rayon or alpha-cellulose) impregnated with melamine resin.

This entire assembly is laminated at high pressures (e. g., 800–1500 p. s. i.) and temperatures (e. g., 270°– 300° F.) for 15–30 minutes (at cure temperature). The back of the cured laminate ($\frac{1}{16}''\pm 0.005''$ thick) is sanded and glued to plywood for use in making dinette sets, counters etc. A special heat-resistant grade may be produced by laminating a piece of metallic foil between the print sheet and the kraft core.

The earlier common method for impregnating kraft paper with phenolic resin employed squeeze rolls with an alcohol-soluble resin which has been diluted to about 50% solids. The squeeze roll method has been largely superseded by a scraper-bar metering system wherein the unsaturated filler (usually kraft paper) is passed through a dip tank filled with the varnish. Upon emerging from the varnish the wet material is passed between opposed scraper bars (or blades), placed a suitable distance above the tank, whereupon both sides are wiped clean of surface resin. Penetration of the filler is partially accomplished during the immersion. However, due to the high linear speed of the paper, a considerable portion of resin is entrained as a thick film up to the scraper height. The residual penetration accomplished in this system is effected in this zone. Since there is no forced penetration (as in the case of squeeze rolls) involved in this treating arrangement, resin pick-up is a function of residence time (time in contact with varnish), resin viscosity, varnish solids content, and resin penetration properties.

The impregnated stock is passed in a long oven (50–150 ft.) where the varnish solvent is evaporated and a partial cure of the resin is effected. The material is normally cut to size (laminate size) upon removal from the oven.

The scraper bar method is comparatively new and effects lower processing costs, provided the resin will have the characteristics which will insure penetration of the fiber filler to obtain satisfactory resin contents and fiber coverage. Such a requirement is not nearly so restrictive for a resin intended for squeeze roll application, since the pressure of the roll forces the resin into the fibers. In fact, it is due to this pressure that, in general, the resin must be diluted to 50% solids content. Consequently, core stock varnishes suitable for application in squeeze rolls are generally unsatisfactory in scraper bar application.

One object of the present invention is to provide a core stock varnish having characteristics which will produce a laminate of good dimensional properties, high water resistance, and satisfactory physical strengths.

Another object of this invention is to provide a varnish having good penetration and high solids content and other characteristics adapted to produce a decorative laminate having little or no warp, good flexural strength and low water absorption.

A further object is to provide a laminating varnish of high solids content adapted particularly for lamination in a scraper-bar system at high treating speeds.

Another object of the invention is to provide a core laminate which has a humidity coefficient substantially the same as a melamine resin sheet.

A still further object is to provide a decorative laminate composed of a phenolic core and a melamine facer which has good dimensional stability, low water absorption and good flexural strength.

Other objects and advantages will be apparent from the following description.

Figure 1:
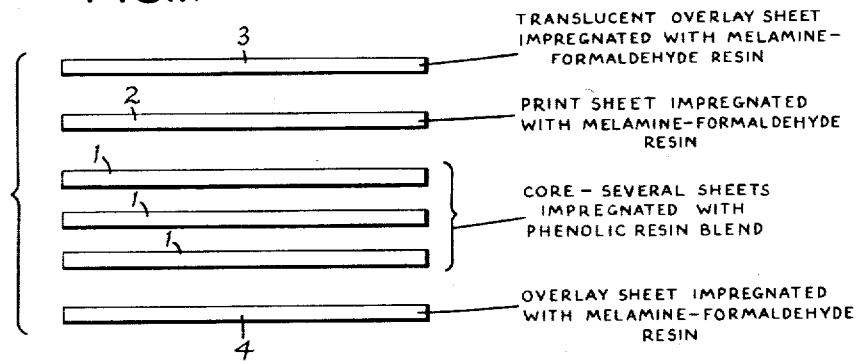
Figure 1 is an end view of a plurality of separated sheets of material for forming a decorative laminate.

Referring to Figure 1, the core is composed of several sheets of kraft paper impregnated with a blend of phenolic resins. Above core 1 is print sheet 2, i. e. the decorative sheet which may be alpha cellulose impregnated with melamine-formaldehyde resin. Above print sheet 2 is translucent overlay sheet 3, such as rayon or alpha cellulose impregnated with melamine-formaldehyde resin. At the bottom, beneath core 1 may be another overlay sheet 4 consisting of rayon or alpha cellulose impregnated with melamine-formaldehyde resin.

Figure 2:
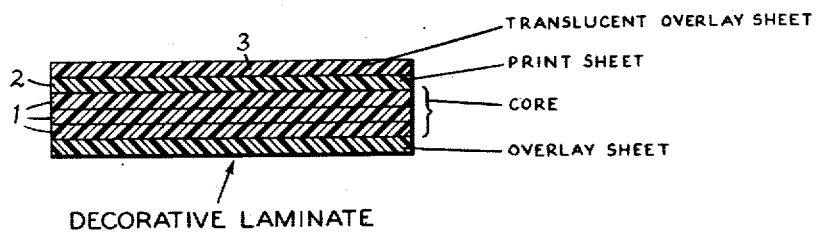
Figure 2 is a sectional view of the decorative laminate.

Figure 2 is a cross-section of the assembly shown in Figure 1 laminated at high pressure and at an elevated temperature. As is seen from the cross-section of Figure 2, at the top and the bottom of the laminate are overlay sheets 3 and 4 respectively. In the center is core 1. Between core 1 and overlay sheet 3 is print sheet 2.

Figure 3:
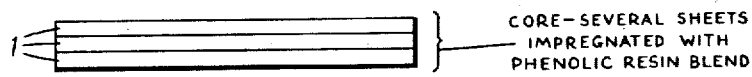
Figure 3 is an end elevation of the core.

Figure 3 illustrates a side elevation of the core assembly.

One of the major problems connected with decorative laminates is their tendency to warp, thereby causing serious difficulties with respect to the sizing, packaging and application of the laminates. Warping in decorative laminates is caused by a differential expansion and contraction between the phenolic and melamine components. This expansion and contraction is caused by the absorption and desorption, by the cellulosic filler fibers, of atmospheric moisture. As the melamine facer and core lose moisture the facer tends to shrink more than the core and the laminate warps. The melamine portion shrinks approximately four to six times as much as the conventional phenolic core. The ideal phenolic core resin would produce a dimensional humidity coefficient exactly equaling that of the melamine component. This condition would produce a perfectly flat sheet. Other laminate properties required of a decorative resin are good flexural strength, low water absorption and machinability. Flexural strength normally is a function of the type of penetration and degree of cure of lamination. Laminate water absorption, for a given resin, is primarily affected by the degree of penetration of the resin. In order to yield satisfactory sawing and shearing properties, the phenolic resin should cure to a hard but not brittle state.

In addition resin for utilization in a scraper-bar system should have the following treating properties: good penetration, high solids content, high efficiency and proper viscosity. Good penetration is required both to insure the desired laminate properties and to effect resin pick-up at the highest possible treating speed. Solids content also directly affects the treating speed, since at a higher percent solids the paper needs to pick up lesser volume of varnish to attain the desired resin content. Varnish efficiency is expressed as a ratio of weight of varnish solids treated to weight of varnish solids obtained at the product end of the oven. Varnish viscosity also affects varnish pick-up in the saturation step.

We have produced a decorative core stock laminating varnish which imparts to the decorative laminate the characteristics of little or no warp, good flexural strength, low water absorption and machinability, and has treating properties required of a good scraper-bar resin, namely, good penetration, high efficiency and proper viscosity by blending a phenol-formaldehyde resin having a water dilutability of at least 5:1, preferably 15:1 to 25:1, with a water-insoluble alcohol-soluble phenol-formaldehyde resin modified by an extender in the proportion of 5:1 parts water-soluble resin to 1:5 parts alcohol-soluble resin, preferably about 30–70% by weight water-soluble resin to 30–70% by weight alcohol-soluble resin. Water dilutability is the number of volumes of water which may be added to one volume of resin (25° C.) before clouding or precipitation occurs.

In order to produce flatter laminates, the shrinkage or expansion of the phenolic core must be made to approximate more closely that of the melamine surfacing. Since the melamine shrinks more on drying and expands more on absorption of moisture than the phenolic core dimensional stability of the phenolic core must be degraded. Various decorative core stock laminating varnishes were tested in an attempt to produce one having the desired characteristics needed in scraper-bar operation. Treatment with conventional water-soluble resin would produce a laminate core with very poor dimensional characteristics (excessive warp). The resultant laminate would also be brittle and possess undesirable flow characteristics. Treatment with a slow penetrating alcohol-soluble resin would yield a laminate with poor water resistance and reduce structural properties. Very important, treating speeds or through-put would be excessively low with such a resin. After extensive experimentation we discovered that a blend of a water-soluble phenol-formaldehyde resin with a modified water-insoluble alcohol-soluble phenol-formaldehyde resin produces a resin with high treating speed and good laminating characteristics, improved dimensional properties, high water resistance and satisfactory physical strength and in all respects eminently suitable for application as a decorative core stock laminating varnish in scraper-bar systems. To produce flatter laminates the dimensional changes in phenolic cores due to humidity variations must be increased. Shrinkage and expansion of phenolic cores is produced by dimensional changes in the walls of the individual fibers making up the kraft paper to be impregnated as they gain or lose water. The greater the amount of the dimensionally stable phenolic resin present in these wall structures the less dimensional change available. A cell or fiber consists of a lumen or canal and a cell wall. Shrinkage or expansion depends upon the moisture content of the cell walls. It is believed that the water-soluble phenol-formaldehyde constituents of the blend enters the fiber structure thus assuring good penetration, while the alcohol-soluble water-insoluble portion only coats the fiber leaving the cell wall to absorb or lose moisture. Stated in other words, the varnish blend of two phenolic resins, having greatly different penetration rates, selectively impregnates the fiber mass. The fast penetrating resin (water soluble) is required to maintain structure and water resistance properties, while the slower penetrating material (alcohol soluble) will tend to coat the fibers and allow the moisture penetration required for proper dimensional properties.

The water-soluble resin component is made using a phenol-formaldehyde ratio ranging from approximately 1:1 to 1:2.5 and an alkali metal or alkaline earth metal catalyst, for example, the oxides, the hydroxides, and the salts of weak acids, preferably sodium hydroxide, potassium hydroxide and sodium and potassium bicarbonate and carbonate. Molecular weight of this resin is approximately within the range of 200 to 500. It is a prerequisite that it have a water dilutability of at least 5:1, preferably higher, i. e., it can have infinite water solubility. The preferred water dilutability of the resin is within the range of 15:1 to 25:1. The water-soluble resin may be prepared by charging phenol and formaldehyde to a reaction vessel together with a small amount of catalyst, usually less than 10%, preferably 1–3% by weight of the phenol. The reaction temperature is brought to about 50–65° C., held there until the free formaldehyde concentration decreases to approximately 2–10%, preferably 2–3%. The resin is then dehydrated under vacuum and when the desired solids content is reached, about 70–90%, vacuum dehydration is interrupted and the resin aged at about 50–60° C. until the resin has a water dilutability of no less than 5:1 and a free formaldehyde concentration of less than 5%, generally about 2 to 3% is reached.

The alcohol-soluble resin component of the blend is made using a phenol to formaldehyde ratio ranging from 1:0.9 to 1:1.3 and an ammonia type catalyst which includes ammonia and ammonia substituted compounds in which one or more hydrogens of ammonia are substituted by an alkyl or aryl group such as, for example, methylamine, dimethylamine, trimethylamine, mono, di, and triethylamine, hexamethylene tetramine, benzylamine, methylbenzylamine. The alcohol-soluble resin component is modified by an abietic acid compound such as abietic acid and its derivatives which include methyl and ethtyl esters of abietic acid commonly sold under trade names such as "Newtrex," "Berez" and "Tallex." The alcohol-soluble resin has a higher molecular weight than the water-soluble resin, ranging from about 400 to 800. This resin is fully soluble in alcohol but insoluble in water. The resin may be prepared by charging phenol and formaldehyde with the catalyst, heating the reaction mass to about 70–95° C. and holding it at that temperature until a free formaldehyde concentration of approximately 2–8% is reached. It is then dehydrated under vacuum and when most of the water has been taken out the resin is aged at 60 to 90° C. until a stroke cure of approximately 90–100 seconds is reached. At this point wood rosin is added, preferably in a solution in alcohol in an amount of about 2 to 25% wood rosin based on phenol charged, preferably 10 to 20%. The addition of wood rosin causes the stroke cure to increase and it is usual to find that its value doubles. Thereafter, the resin is further aged until the final desired stroke cure is reached, i. e., within the range of about 50 to 130 seconds at 150° C., preferably 50 to 90 seconds at 150° C.

The following tabulation I is illustrative of the properties of the caustic catalyzed water-soluble resin, the ammonia catalyzed alcohol-soluble water-insoluble resin and a blend of the two resins to produce a laminating varnish. The second tabulation II below gives the preferred properties.

*I*

|  | Caustic Catalyzed Water-Soluble Resin | Ammonia Catalyzed Soluble Water-Insoluble Resin | Blend |
| --- | --- | --- | --- |
| Methanol Solids, percent | 55–80 |  |  |
| ASTM Solids, percent |  | 50–70 | 52–78 |
| Viscosity at 25 C., cp | 100–1,000 | 100–4,000 | 100–1,200 |
| Specific Gravity at 25/25 C | 1.10–1.40 | 0.95–1.20 | 1.00–1.35 |
| Stroke Cure at 150 C., seconds | 50–200 | 30–140 | 50–200 |
| Free Formaldehyde, percent | 4.0 max. | 3.0 max. | 3.5 max. |
| Dilutability | 5:1 to ∞ |  |  |

| | Caustic Catalyzed Water-Soluble Resin | Ammonia Catalyzed Soluble Water-Insoluble Resin | Blend |
|---|---|---|---|
| Methanol Solids, percent | 65-75 | | |
| ASTM Solids, percent | | 55-65 | 62-72. |
| Viscosity at 25 C., cp | 350-700 | 300-800 | 200-700. |
| Specific Gravity at 25/25 C | 1.15-1.30 | 1.05-1.15 | 1.10-1.25. |
| Stroke Cure at 150 C, seconds | 80-140 | 45-90 | 70-130. |
| Free Formaldehyde, percent | 2.0 max | 1.0 max | 1.5 max. |
| Dilutability | 15:1 to 25:1 | | |

The following example illustrates the present invention.

A water-soluble resin component is prepared as follows: 1000 parts by weight of USP phenol and 930 parts by weight of formaldehyde, 50% solution, uninhibited (in the proportion of 1.0 mol phenol to 1.45 mols formaldehyde), together with 40 parts by weight of sodium hydroxide, 25% solution (1% by weight of phenol, dry basis), are charged into a steam jacketed reaction vessel and heated to 70° C. and maintained at that temperature until the free formaldehyde concentration of the reaction mixture is 2.7-9%. Upon attaining the specified formaldehyde concentration a vacuum of 28 inches mm. Hg is gradually applied to the reaction vessel to dehydrate the reaction mixture by distillation of water. Dehydration is continued until the reaction mixture has a viscosity of 350 cp. The resin is then bodied in the reaction chamber at 60° C. until the dilutability with water is 15:1. The resultant resin had the following characteristics: solids content, percent—73.5; viscosity at 25 C., cp.—500; specific gravity at 25/25 C.—1.22; stroke cure at 150 seconds—90; set time at 135 seconds—520; free formaldehyde percent—1.8; pH—8.0; and dilutability—15:1.

The alcohol-soluble water-insoluble resin is prepared as follows: 1000 parts by weight of USP phenol and 705 parts by weight of formaldehyde, 50% solution, uninhibited (in the proportion of 1.0 mol phenol to 1.1 mols formaldehyde), together with 1.25% by weight of phenol, dry basis, of ammonium hydroxide, 28% solution (44.5 parts by weight) are charged into the steam jacketed reaction vessel equipped with a reflux condenser and heated under vacuum to reflux at 75° C. and maintained at that temperature until the free formaldehyde content is 6-7%. The mixture is dehydrated immediately until there is a sharp rise in temperature. The resin is bodied at 80° C. until a cure of 75-85 seconds is obtained. A wood rosin solution (50% alcohol) in an amount of 18% by weight phenol, dry basis (180 parts by weight) is added to the reaction mixture and the resin bodied at 80° C. to a cure of 70-80 seconds. An anhydrous ethyl alcohol is added in an amount sufficient to produce a solution containing 61.3% resin. The resultant resin had the following properties: solids content, percent—61.3; viscosity at 25° C., cp.—700; specific gravity at 25/25 C., 1.1; stroke cure at 150 C., seconds, 107; set time at 135° C., seconds—560; free formaldehyde, percent—0.8; water content, k. f. percent—3.0. A blend of water-soluble resin and the alcohol-soluble resin produced as above in the proportion of 70 parts by weight water-soluble resin and 30 parts by weight alcohol-soluble resin with sufficient anhydrous ethyl alcohol to produce a resin solids content of 68%, has the following properties: viscosity of 25 cp.—400; specific gravity at 25/25 C.—1.18; stroke cure at 150° C., seconds—110; set time at 135° C., seconds—620; free formaldehyde percent—1.6.

In order to study and verify the improved dimensional characteristics of cores impregnated with a resin blend, in accordance with the present invention, a test was carried out to measure the linear dimensional change of laminated decorative cores due to the absorption and desorption of atmospheric moisture. Conventional paper core stocks were impregnated on a twenty foot horizontal treater, with a blend of phenolic resin as prepared above, using scraper bars. The treated materials were then conditioned for sixty hours at 50% relative humidity at a dry bulb temperature of 73.4±2° F. Laminates of 1/16" thickness were prepared from the core material without the melamine print and overlay sheet. Separate laminates were also prepared from melamine impregnated print sheets. Specimens 4" x 2" x 1/16" were cut from the laminated boards, one with the four inch dimension running parallel and one perpendicular to the machine direction of the paper (LW and CW, respectively). Perpendicular lines, running along the width and length, were scribed on the specimens. Measurements of the width and length were then taken along these lines with a micrometer. Duplicate specimens were run in each case. Length and width measurements were taken prior to the conditioning. The specimens were then conditioned simultaneously for forty eight hours at 50° C., removed and cooled in a desiccator for four hours. Length and width measurements were again recorded. The change in length and percent change in length were calculated and recorded. The results of the tests are shown below.

| Material | Initial Length | Final length | Length | Percent Length |
|---|---|---|---|---|
| LW: | | | | |
| Resin Blend 1* | 3.9558 | 3.9403 | .0155 | .39 } .35 |
| Resin Blend 2* | 3.9572 | 3.9448 | .0124 | .31 |
| CW: | | | | |
| Resin Blend 1 | 1.9966 | 1.9867 | .0099 | .50 } .54 |
| Resin Blend 2 | 2.0032 | 1.9916 | .0116 | .58 |
| LW: | | | | |
| Undried Melamine 1 | 4.0098 | 3.9789 | .0309 | .77 |
| Undried Melamine 2 | 3.9942 | 3.9628 | .0314 | .78 |
| CW: | | | | |
| Undried Melamine 1 | 2.0139 | 2.0050 | .0089 | .44 } .42 |
| Undried Melamine 2 | 2.0148 | 2.0068 | .0080 | .40 |

* Duplicate tests.

The differential in length between the impregnated core and the undried melamine and melamine is a marked improvement over laminates prepared with conventional resins.

In a further evaluation of laminating varnish prepared by blending a water-soluble resin with an alcohol-soluble resin as described above, an eleven mil kraft stock was saturated with the resin blend in a scraper bar system at a web speed of 21.5 feet per minute. The press-cure cycle was 20-22 minutes and 285°-295° F. and 1100 p. s. i. Unplasticized melamine print sheets and overlays were dried prior to lamination in a forced-draft oven for 75 minutes at 90° C. Laminate testing, with the exception of the warp test, was performed in accordance with National Electrical Manufacturers Association LP2—1951 requirements. The warp test is run on a 2" x 11" strip, which is placed concave side down on a flat surface. The vertical height of the center of the arc above this flat surface is measured both before and after conditioning for 24 hours in a 50° C. gravity oven. The change in height is reported as deformation in inches.

From the following summary of data resulting from these tests, it will be evident that decorative laminates composed of a core impregnated with a blend of phenolic resins in accordance with the present invention and melamine facers have excellent dimensional stability, high water resistance, and good physical strengths and in addition permit impregnation at a high treating speed.

*Laminate properties*

Water absorption:                         Percent
   Weight increase _____ 2.8
   Thickness increase _____ 2.0

*Flexural strength*

Facer in tension:
   LW (p. s. i.) _____ 20,300±500
   CW (p. s. i.) _____ 20,600±400

*Modulus of elasticity*

Facer in tension:
- LW (p. s. i.) _____ $1.3 \times 10^6$
- CW (p. s. i.) _____ $1.3 \times 10^6$

*Warp*
- Initial height (inch) _____ 0.28
- Deformation _____ 0.3

Although certain preferred embodiments of the invention have been disclosed for purpose of illustration it will be evident that various changes and modifications may be made therein without departing from the scope and spirit of the invention.

We claim:

1. A core stock varnish particularly adapted for use in decorative laminates which comprises a blend of a water-soluble phenol-formaldehyde resin having a water dilutability of at least 5:1 produced by reacting phenol and formaldehyde in the molar ratio of about 1:1 to 1:2.5 in the presence of an alkali metal compound catalyst and a water-insoluble, alcohol-soluble modified phenoformaldehyde resin produced by reacting phenol and formaldehyde in the molar proportion of about 1:0.9 to 1:1.3 in the presence of an ammonia type catalyst selected from the group consisting of ammonia and ammonia substituted compounds in which at least one hydrogen of ammonia is substituted by a hydrocarbon radical and modified by an abietic acid compound, said water-soluble resin and alcohol-soluble modified resin being blended in the proportion of 5:1 to 1:5 parts water-soluble resin to alcohol-soluble resin.

2. A core stock varnish particularly adapted for use in decorative laminates which comprises a blend of a water-soluble phenol-formaldehyde resin having a water dilutability within the range of 15:1 to 25:1 produced by reacting phenol and formaldehyde in the molar ratio of about 1:1 to 1:2.5 in the presence of an alkali metal compound catalyst and a water-insoluble, alcohol-soluble modified phenol-formaldehyde resin produced by reacting phenol and formaldehyde in the molar proportion of about 1:0.9 to 1:1.3 in the presence of an ammonia catalyst and modified by a wood rosin, said water-soluble resin and alcohol-soluble modified resin being blended in the proportion of approximately 30–70% by weight water-soluble resin to 30–70% by weight alcohol-soluble resin.

3. A core stock varnish particularly adapted for use in decorative laminates which comprises a blend of an alkaline metal compound catalyzed water-soluble phenol-formaldehyde resin produced by reacting phenol and formaldehyde in the molar ratio of about 1:1 to 1:2.5 with an abietic acid compound modified alcohol-soluble water-insoluble phenol-formaldehyde resin produced by reacting phenol and formaldehyde in a molar proportion of about 1:0.9 to 1:1.3 in the presence of an ammonia type catalyst selected from the group consisting of ammonia and ammonia substituted compounds in which at least one hydrogen of ammonia is substituted by a hydrocarbon radical having the following characteristics: ASTM solids, percent, 52–78; viscosity at 25 C., cp., 100–1200; specific gravity at 25/25 C., 1.00–1.35; stroke cure at 150 C. seconds, 50–200; free formaldehyde, percent, 3.5 maximum; produced by blending an alkaline metal compound catalyzed water-soluble resin having the following characteristics: methanol solids, percent, 55–80; viscosity at 25 C., cp., 100–1000; specific gravity at 25/25 C., 1.10–1.40; stroke cure at 150 C., seconds, 50–200; free formaldehyde, percent, 4.0 maximum; dilutability, 5:1 to ∞; with an abietic acid compound modified catalyzed alcohol-soluble water-insoluble resin having the following characteristics: ASTM solids, percent, 50–70; viscosity at 25 C., cp., 100–4000; specific gravity at 25/25 C., 0.95–1.20; stroke cure at 150 C., seconds, 30–140; free formaldehyde, percent, 3.0 maximum.

4. A core stock varnish particularly adapted for use in decorative laminates which comprises a blend of a caustic catalyzed water-soluble phenol-formaldehyde resin produced by reacting phenol and formaldehyde in the molar ratio of about 1:1 to 1:2.5 with a wood rosin modified ammonia catalyzed alcohol-soluble water-insoluble phenol-formaldehyde resin produced by reacting phenol and formaldehyde in the molar proportion of about 1:0.9 to 1:1.3 having the following characteristics: ASTM solids, percent, 62–72; viscosity at 25 C., cp., 200–700; specific gravity at 25/25 C., 1.10–1.25; stroke cure at 150 C. seconds, 70–130; free formaldehyde, percent, 1.5 maximum; produced by blending a caustic catalyzed water-soluble resin having the following characteristics: methanol solids, percent, 65–75; viscosity at 25 C., cp., 350–700; specific gravity at 25/25 C., 1.15–1.30; stroke cure at 150 C., seconds, 80–140; free formaldehyde, percent 2.0 maximum; dilutability, 15:1 to 25:1; with a wood rosin modified catalyzed alcohol-soluble water-insoluble resin having the following characteristics: ASTM solids, percent, 55–65; viscosity at 25 C., cp., 300–800; specific gravity at 25/25 C., 1.05–1.15; stroke cure at 150 C., seconds, 45–90; free formaldehyde, percent, 1.0 maximum.

5. A core stock adapted for use in decorative laminates comprising several sheets of kraft paper impregnated with the core stock varnish as claimed in claim 1.

6. A core stock adapted for use in decorative laminates comprising several sheets of kraft paper impregnated with the core stock varnish as claimed in claim 3.

7. A core stock adapted for use in decorative laminates comprising several sheets of kraft paper impregnated with the core stock varnish as claimed in claim 4.

8. A decorative laminate having excellent dimensional stability, high water resistance and good physical strengths comprising a core stock of several sheets of kraft paper impregnated with the core stock varnish as claimed in claim 1, faced with a melamine-formaldehyde resin sheet.

9. A core stock varnish particularly adapted for use in decorative laminates which comprises a blend of a water-soluble phenol-formaldhyde resin having a water dilutability within the range of 15:1 to 25:1 produced by reacting phenol and formaldehyde in the molar ratio of about 1:1 to 1:2.5 in the presence of an alkali metal compound catalyst and a water-insoluble, alcohol-soluble modified phenol-formaldehyde resin produced by reacting phenol and formaldehyde in the molar proportion of about 1:0.9 to 1:1.3 in the presence of an ammonia catalyst and modified by a wood rosin, said water-soluble resin and alcohol-soluble modified resin being blended in the proportion of 5:1 to 1:5 parts water-soluble resin to alcohol-soluble resin.

10. A core stock adapted for use in decorative laminates comprising several sheets of kraft paper impregnated with the core stock varnish as claimed in claim 2.

References Cited in the file of this patent

UNITED STATES PATENTS

| | | |
|---|---|---|
| 2,110,073 | Alvarado et al. | Mar. 1, 1938 |
| 2,351,716 | Smith | June 20, 1944 |
| 2,439,929 | Hill et al. | Apr. 20, 1948 |
| 2,489,228 | Rudd | Nov. 22, 1949 |
| 2,694,028 | Rapp | Nov. 9, 1954 |

OTHER REFERENCES

Laminating with melamine resins by T. W. Noble in Plastics, December 1946, pages 46, 48, 49, 94 and 95.

UNITED STATES PATENT OFFICE

CERTIFICATE OF CORRECTION

Patent No. 2,801,198                                                      July 30, 1957

William E. Morris et al.

It is hereby certified that error appears in the printed specification of the above numbered patent requiring correction and that the said Letters Patent should read as corrected below.

Column 4, line 45, for "90-100 seconds" read -- 70-100 seconds --; column 5, line 25, for "2.7-9%" read -- 2.7-2.9% --.

Signed and sealed this 19th day of November 1957.

(SEAL)
Attest:

KARL H. AXLINE
Attesting Officer

ROBERT C. WATSON
Commissioner of Patents